United States Patent
Huang et al.

(10) Patent No.: US 9,740,333 B2
(45) Date of Patent: *Aug. 22, 2017

(54) DETECTING METHOD AND MANUFACTURING METHOD OF EMBEDDED TYPE TOUCH PANEL

(71) Applicant: Shenzhen China Star Optoelectronics Technology Co., Ltd., Shenzhen, Guangdong (CN)

(72) Inventors: Chun-hung Huang, Guangdong (CN); Xiaoping Tan, Guangdong (CN); Yujie Bai, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 51 days.

This patent is subject to a terminal disclaimer.

(21) Appl. No.: 14/433,660

(22) PCT Filed: Dec. 30, 2014

(86) PCT No.: PCT/CN2014/095553
§ 371 (c)(1),
(2) Date: Apr. 4, 2015

(87) PCT Pub. No.: WO2016/095274
PCT Pub. Date: Jun. 23, 2016

(65) Prior Publication Data
US 2016/0357333 A1 Dec. 8, 2016

(30) Foreign Application Priority Data
Dec. 19, 2014 (CN) .......................... 2014 1 0805605

(51) Int. Cl.
*G06F 3/041* (2006.01)
*G06F 3/044* (2006.01)
*G02F 1/1333* (2006.01)

(52) U.S. Cl.
CPC ............ *G06F 3/0418* (2013.01); *G06F 3/044* (2013.01); *G06F 3/0412* (2013.01); *G02F 1/13338* (2013.01); *G06F 2203/04103* (2013.01)

(58) Field of Classification Search
CPC ........ G06F 3/041–3/0416; G06F 2203/04103; G09G 3/36–3/3696
See application file for complete search history.

(56) References Cited

U.S. PATENT DOCUMENTS

2006/0232577 A1* 10/2006 Edwards .............. G09G 3/3648
345/211
2007/0047801 A1* 3/2007 Kojima ................. G06T 7/0004
382/149

(Continued)

FOREIGN PATENT DOCUMENTS

JP 08241046 A * 9/1996

OTHER PUBLICATIONS

English translation of JP 08241046 A (Abstract and Detailed Description only).*

*Primary Examiner* — Nathan Danielsen
(74) *Attorney, Agent, or Firm* — Andrew C. Cheng (57) ABSTRACT

A detecting method and a manufacturing method of an embedded type touch panel are provided. The detecting method includes steps of: supplying first touch electrodes and second touch electrodes alternately arranged at least on a first direction with different voltages via corresponding touch-control wires to make display areas where the first touch electrodes are located and display areas where the second touch electrodes are located have different luminances, and at least determining neighboring first touch electrode and second touch electrode on the first direction whether are short-circuited or not according to the luminances of the display areas where the first touch electrodes (Continued)

are located and the luminances of the display areas where the second touch electrodes are located. By the above solution, the invention can simply and effectively realize a detection of touch panel.

15 Claims, 5 Drawing Sheets

(56) References Cited

U.S. PATENT DOCUMENTS

| | | | |
|---|---|---|---|
| 2009/0273753 A1* | 11/2009 | Park | G09G 3/006 349/152 |
| 2014/0210771 A1* | 7/2014 | Kim | G06F 3/0412 345/174 |

* cited by examiner

DETECTING METHOD AND MANUFACTURING METHOD OF EMBEDDED TYPE TOUCH PANEL

TECHNICAL FIELD

The invention relates to the field of touch-control technology, and particularly to a detecting method and a manufacturing method of an embedded type touch panel.

DESCRIPTION OF RELATED ART

Compared with a traditional technology of mounting a touch panel on a liquid crystal panel, the research of integrating a touch panel function with a liquid crystal panel together is increasingly popular, and thus an embedded type touch screen has been proposed. The embedded type touch screen technologies include two types of in-cell and on-cell. The in-cell touch screen technology is embedding the touch panel function into liquid crystal pixels, and the on-cell touch screen technology is embedding the touch panel function between a color filter substrate and a polarizer. Compared with the on-cell touch screen, the in-cell touch screen can make the panel be more light and thin.

In the in-cell touch screen technology, a self-capacitance touch detection technology generally is used to detect coordinates of touch point, a principle thereof is that a plurality of touch electrodes are embedded into liquid crystal pixels, the touch electrodes each forms a capacitor with the ground together, the formed capacitor being a self-capacitor, i.e., the capacitor of touch electrode to the ground, and when a finger touches the screen, another capacitor caused by the finger will be superimposed on the self-capacitor, so that a capacitance of the self-capacitor is increased. Accordingly, by detecting the capacitance change of each of the touch electrodes with respect to the ground, the position of touch point can be detected out.

Each of the touch electrodes is electrically connected to a touch-control IC by a touch-control wire to allow the touch-control IC to perform scans of the touch electrodes, and thereby the capacitance change detection of the self-capacitors can be achieved and the touch-control operation is realized consequently. However, each touch electrode is prone to be open-circuited or short-circuited, for example the touch electrode itself may be open-circuited or short-circuited, or the touch-control wires connected to the touch electrode may be open-circuited or short-circuited, resulting in the touch-control operation being not realized, especially it is more easily to be short-circuited between the touch electrodes. Therefore, how to simply and quickly and effectively detect whether a short circuit has occurred or not has been an urgent problem desired to be solved.

SUMMARY

Accordingly, a technical problem mainly to be solved by the invention is to provide a detecting method and a manufacturing method of an embedded type touch panel, which can simply and effectively realize the detection of touch electrode.

In order to solve the above technical problem, a technical solution proposed by the invention is to provide a detecting method of an embedded type touch panel. The embedded type touch panel includes a plurality of touch electrodes arranged in a matrix manner and insulated from one another. Each of the plurality of touch electrodes and a touch-control wire are electrically connected in one-to-one manner. The touch-control wire extends along a first direction. The detecting method includes: supplying a low voltage level to first touch electrodes via corresponding touch-control wires to make display areas where the first touch electrodes are located be in dark states; supplying a high voltage level to second touch electrodes via corresponding touch-control wires to make display areas where the second touch electrodes are located be in bright states, wherein the first touch electrodes and the second touch electrodes are alternately arranged on both the first direction and a second direction; when the display area where one of the first touch electrodes is located is in a bright state, determining that the one of the first touch electrodes is short-circuited with the second touch electrode neighboring therewith on the first direction.

In an embodiment, after the step of determining that the first touch electrode is short-circuited with the second touch electrode neighboring therewith on the first direction, the detecting method includes: supplying a high voltage level to the first touch electrodes via corresponding touch-control wires to make the display areas where the first touch electrodes are located be in bright states; supplying a low voltage level to the second touch electrodes via corresponding touch-control wires to make the display areas where the second touch electrode are located be in dark states; when the display area where the one of the first touch electrodes is located and the display area where the second touch electrode neighboring with the one of the first touch electrodes is located both are in dark states, determining that the one of the first touch electrodes is open-circuited.

In an embodiment, before supplying the first touch electrodes and the second touch electrodes alternately arranged at least on the first direction with different voltage levels via corresponding touch-control wires, the detecting method includes: supplying the first touch electrodes and the second touch electrodes both with high voltage levels via corresponding touch-control wires to make the display areas where the first touch electrodes are located and the display areas where the second touch electrodes are located be in bright states; when the display area where one of the first touch electrodes is located and/or the display area where one of the second touch electrodes is located is/are in a dark state(s), determining that the one of the first touch electrodes and/or the one of the second touch electrodes is/are open-circuited.

In order to solve the above technical problem, another technical solution proposed by the invention is to provide a detecting method of an embedded type touch panel. The embedded type touch panel includes a plurality of touch electrodes arranged in a matrix manner and insulated from one another. Each of the plurality of touch electrodes and a touch-control wire are electrically connected in one-to-one manner. The touch-control wire extends along a first direction. The detecting method includes: supplying first touch electrodes and second touch electrodes alternately arranged at least on the first direction with different voltages via corresponding touch-control wires to make display areas where the first touch electrodes are located and display areas where the second touch electrodes are located have different luminances, and at least determining neighboring first touch electrode and second touch electrode on the first direction whether are short-circuited or not according to the luminances of the display areas where the first touch electrodes are located or the luminances of the display areas where the second touch electrodes are located.

In an embodiment, the step of supplying first touch electrodes and second touch electrodes alternately arranged at least on the first direction with different voltages via corresponding touch-control wires to make display areas where the first touch electrodes are located and display areas where the second touch electrodes are located have different luminances includes: supplying a low voltage level to the first touch electrodes via corresponding touch-control wires to make the display areas where the first touch electrodes are located be in dark states; supplying a high voltage level to the second touch electrodes via corresponding touch-control wires to make the display areas where the second touch electrodes are located be in bright states; when the display area where one of the first touch electrodes is located is in a bright state, determining that the one of the first touch electrodes is short-circuited with the second touch electrode neighboring therewith on the first direction.

In an embodiment, after the step of determining that the one of the first touch electrodes is short-circuited with the second touch electrode neighboring therewith on the first direction, the detecting method includes: supplying a high voltage level to the first touch electrodes via corresponding touch-control wires to make the display areas where the first touch electrodes are located be in bright states; supplying a low voltage level to the second touch electrodes via corresponding touch-control wires to make the display areas where the second touch electrodes are located be in dark states; when the display area where the one of the first touch electrodes is located and the display area where the second touch electrode neighboring with the one of the first touch electrodes is located both are in dark states, determining that the one of the first touch electrodes is open-circuited.

In an embodiment, before the step of supplying first touch electrodes and second touch electrodes alternately arranged at least on the first direction with different voltages via corresponding touch-control wires, the detecting method includes: supplying the first touch electrodes and the second touch electrodes both with high voltage levels via corresponding touch-control wires to make the display areas where the first touch electrodes are located and the display areas where the second touch electrodes are located be in bright states; when the display area where one of the first touch electrodes is located and/or the display area where one of the second touch electrodes is located is/are in a dark state(s), determining that the one of the first touch electrode and/or the one of the second touch electrode is/are open-circuited.

In an embodiment, the first touch electrodes and the second touch electrodes further are alternately arranged on a second direction.

In order to solve the above technical problem, still another technical solution proposed by the invention is to provide a manufacturing method of an embedded type touch panel including: forming a plurality of touch electrodes which are arranged in a matrix manner and insulated from one another on a display region of a first substrate and forming touch-control wires electrically connected to the plurality of touch electrodes in one-to-one manner, wherein the touch-control wires extend along a first direction, the plurality of touch electrodes comprise first touch electrodes and second touch electrodes alternately arranged at least on the first direction; bonding a second substrate with the display region of the first substrate; performing a detecting for the touch panel after the bonding, and a detecting method including: supplying the first touch electrodes and the second touch electrodes with different voltages via corresponding touch-control wires to make display areas where the first touch electrodes are located and display areas where the second touch electrodes are located have different luminances, and at least determining neighboring first touch electrode and second touch electrode on the first direction whether are short-circuited or not according to the luminances of the display areas where the first touch electrodes are located or the luminances of the display areas where the second touch electrodes are located.

In an embodiment, the step of supplying the first touch electrodes and the second touch electrodes with different voltages via corresponding touch-control wires to make display areas where the first touch electrodes are located and display areas where the second touch electrodes are located have different luminances includes: supplying a low voltage level to the first touch electrodes via corresponding touch-control wires to make the display areas where the first touch electrodes are located be in dark states; supplying a high voltage level to the second touch electrodes via corresponding touch-control wires to make the display areas where the second touch electrodes are located be in bright states; when the display area where one of the first touch electrodes is located is in a bright state, determining that the one of the first touch electrodes is short-circuited with the second touch electrode neighboring therewith on the first direction.

In an embodiment, after the step of determining that the one of the first touch electrodes is short-circuited with the second touch electrode neighboring therewith on the first direction, the detecting method includes: supplying a high voltage level to the first touch electrodes via corresponding touch-control wires to make the display areas where the first touch electrodes are located be in bright states; supplying a low voltage level to the second touch electrodes via corresponding touch-control wires to make the display areas where the second touch electrodes are located be in dark states; when the display area where the one of the first touch electrodes is located and the display area where the second touch electrode neighboring with the one of the first touch electrodes is located both are in dark states, determining that the one of the first touch electrodes is open-circuited.

In an embodiment, before the step of supplying the first touch electrodes and the second touch electrodes alternately arranged at least on the first direction with different voltages via corresponding touch-control wires, the detecting method includes: supplying the first touch electrodes and the second touch electrodes both with high voltage levels via corresponding touch-control wires to make the display areas where the first touch electrodes are located and the display areas where the second touch electrodes are located be in bright states; when the display area where one of the first touch electrodes is located and/or the display area where one of the second touch electrodes is located is/are in a dark state(s), determining that the one of the first touch electrodes and/or the one of the second touch electrodes is/are open-circuited.

In an embodiment, the first touch electrodes and the second touch electrodes further are alternately arranged on a second direction The efficacy can be achieved by the invention is that: different from the prior art, in the detecting method of the invention, first touch electrodes and second touch electrodes alternately arranged on a first direction are supplied with different voltages to make display areas where the first touch electrodes are located and display areas where the second touch electrodes are located have different luminances. In a normal situation, i.e., a situation of the first touch electrodes and the second touch electrodes having no fault, the luminances of the display areas where the first touch electrodes are located and the luminances of the display areas where the second touch electrodes are located are different, and because of the first touch electrodes and the second touch electrodes being alternately arranged on the first direction, the luminance distribution on the touch panel as observed ought to be an alternate light and shade distribution on the first direction, but if neighboring first touch electrode and second touch electrode are short-circuited, for the short-circuited first touch electrode and second touch electrode, the touch electrode with a relatively low voltage would obtain a relatively high voltage same as or approximate to that of the other one touch electrode, so that the luminance of the display area corresponding thereto is same as or approximate to the luminance of the display area where the other one touch electrode is located, and at this time at least two continuous display areas having same or approximate luminances can be observed on the touch panel. Therefore, neighboring first touch electrode and second touch electrode on the first direction whether are short-circuited or not can be quickly determined according to the luminances of the display areas where the first touch electrodes are located or the luminances of the display areas where the second touch electrodes are located, and thus the detection for touch electrodes can be simply and effectively realized.

BRIEF DESCRIPTION OF THE DRAWINGS

In order to more clearly illustrate the technical solutions of various embodiments of the present invention, drawings will be used in the description of embodiments will be given a brief description below. Apparently, the drawings in the following description only are some embodiments of the invention, the ordinary skill in the art can obtain other drawings according to these illustrated drawings without creative effort. In the drawings.

DETAILED DESCRIPTION OF EMBODIMENTS

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Figure 1:
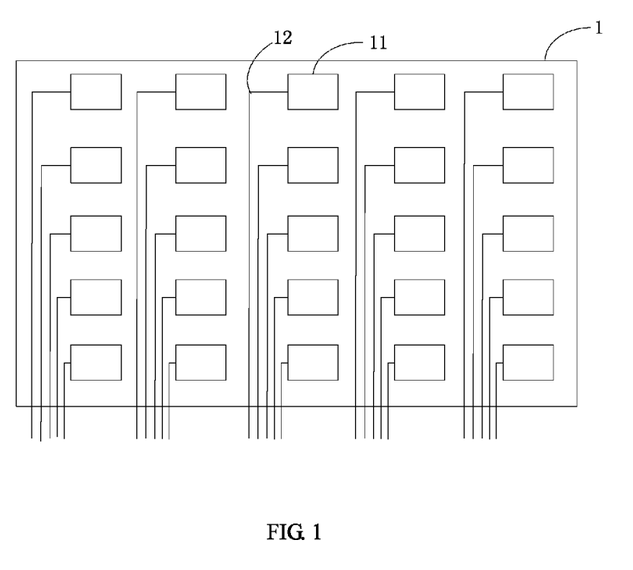
FIG. 1 is a structural schematic view of an embedded type touch panel.

Referring to FIG. 1, which is a structural schematic view of an embodiment of an embedded type touch panel. In particular, a display technology of the embedded type touch panel 1 is a liquid crystal display technology, and a touch-control function of the embedded type touch panel 1 is realized by the use of in-cell technology. The embedded type touch panel 1 includes a plurality of touch electrodes 11 arranged in a matrix manner and insulated from one another. The touch electrodes 11 can be formed by using a common electrode for driving the embedded type touch panel to display. Each of the touch electrodes 11 and a touch-control wire 12 are electrically connected in one-to-one manner. The touch-control wires 12 corresponding to any one column of touch electrodes 11 are located at a same side of the column, and the touch-control wires 12 extend outside the touch panel along the column direction to facilitate to be electrically connected with a touch-control IC in subsequent process.

Figure 2:
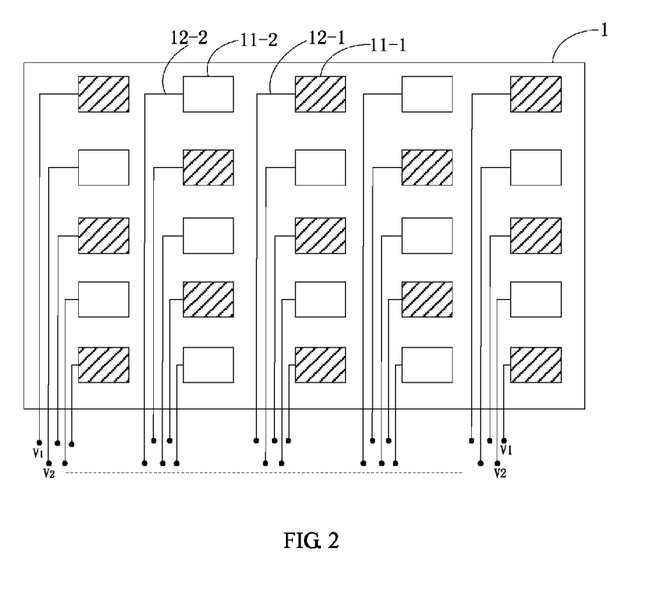
FIG. 2 is a schematic view of a luminance distribution of a touch panel in the situation of touch electrodes being normal, associated with an embodiment of a detecting method of an embedded type touch panel of the invention.
Figure 3:
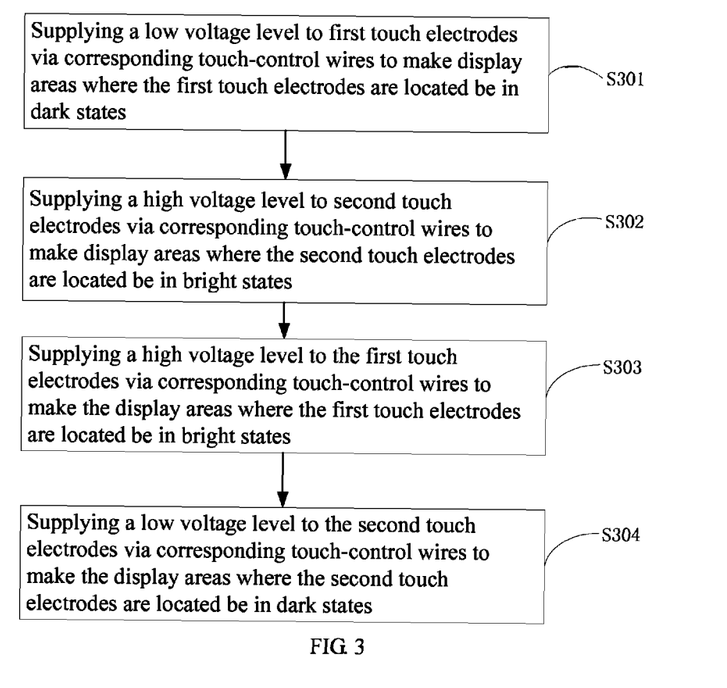
FIG. 3 is flowchart of an embodiment of the detecting method of an embedded type touch panel of the invention.

Referring to FIG. 2, which is a schematic view of a luminance distribution of a touch panel in the situation of the touch electrodes being normal, associated with an embodiment of a detecting method of an embedded type touch panel of the invention. The embedded type touch panel for example is with electrodes of a 4×5 matrix for the purpose of illustration, as to the embedded type touch panel with such matrix type touch electrodes, for each column of touch electrodes 11, neighboring two touch-control wires 12 are easily to be short-circuited; and for each row of touch electrodes 11, one touch electrode 11 and one touch-control wire 12 neighboring therewith are easily to be short-circuited. By adopting the detecting method of this embodiment, a short circuit whether has occurred between two touch electrodes can be simply and effectively detected out, and an open circuit occurred on some of touch electrodes also can be detected out. The detection of touch electrodes includes the detection for the touch electrodes themselves and the detection for the touch-control wires. Concretely, referring to FIG. 3 in conjunction with FIG. 2, the detecting method includes the following steps that:

Step S301: supplying a low voltage level to first touch electrodes 11-1 via corresponding touch-control wires 12-1 to make display areas where the first touch electrodes 11-1 are located be in dark states.

In this embodiment, all the touch electrodes are classified into first touch electrodes 11-1 and second touch electrodes 11-2. The first touch electrodes 11-1 and the second touch electrodes 11-2 are alternately arranged on both a first direction and a second direction. The first direction and the second direction in this embodiment respectively are the column direction and the row direction. As shown in FIG. 2, the first touch electrodes 11-1 include odd touch electrodes in odd rows and even touch electrodes in even rows, the second touch electrodes 11-2 include even touch electrodes in the odd rows and odd touch electrodes in the even rows. Each of the first touch electrodes 11-1 is corresponding to an input port V1, and each of the second touch electrodes 11-2 is corresponding to an input port V2.

The touch electrodes 11 are formed by the common electrode, and thus by controlling voltages on the touch electrodes 11, it can control the touch panel whether to display as well as control the displayed luminances of the touch panel. In this step, all V1 ports are electrically connected to a low voltage level to supply the low voltage level to all the first touch electrodes 11-1, the first touch electrodes 11-1 may be supplied with a low voltage level of 0V, or electrically connected to the ground, or the V1 ports are electrically connected to the ground, or the V1 ports are floating, so that the display areas where the first touch electrodes 11-1 are located are not lit, i.e., the luminance is 0.

Step S302: supplying a high voltage level to second touch electrodes 11-1 via corresponding touch-control wires 12-2 to make display areas where the second touch electrodes 11-2 are located be in bright states.

The step S301 and the step S302 may be performed simultaneously. By making all the V2 ports be electrically connected to a high voltage level, the second touch electrodes 11-2 are applied with a high voltage level required for display, so that the display areas where the first touch electrodes 11-2 are located are lit and thus exhibit bright states.

In this embodiment, by making the display areas where some of the first touch electrodes 11-1 are located be in dark states and the display areas where some of the second touch electrodes 11-2 are located be in bright states, neighboring first touch electrode 11-1 and second touch electrode 11-2 on the row direction and the column direction whether are short-circuited or not can be conveniently determined.

In a normal situation, i.e., a situation of the first touch electrodes 11-1 and the second touch electrodes 11-2 all having no fault occurred, the display areas where the first touch electrodes 11-1 are located are in dark states, the display areas where the second touch electrodes 11-2 are located are in bright states, the first touch electrodes 11-1 and the second touch electrodes 11-2 are alternately arranged, so that a pattern exhibited on the whole display region of the touch panel is bright and dark alternately distributed, as shown in FIG. 2. If one first touch electrode 11-1 is short-circuited with one second touch electrode 11-2, the short-circuited first touch electrode 11-1 would obtain the same high voltage level as the second touch electrode 11-2 and thus the display area where the shorted-circuited first touch electrode 11-1 is located is in a bright state. Therefore, the first touch electrodes 11-1 whether have a short circuit occurred can be determined according to the luminances of the first touch electrodes 11-1.

Accordingly, when driving the display areas where the first touch electrodes 11-1 are located to be in dark states and driving the display areas where the second touch electrodes 11-2 are located to be in bright states, if the display area where one of the first touch electrodes 11-1 is located is in a bright state, it means that the first touch electrode 11-1 is short-circuited with the second touch electrodes 11-2; since the short circuit easily occurs between neighboring two touch electrodes 11, and therefore when the display area where one first touch electrode 11-1 is located is in a bright state, it can be determined that the first touch electrode 11-1 is short-circuited with the second touch electrode 11-2 neighboring therewith on the column direction or on the row direction.

Figure 4:
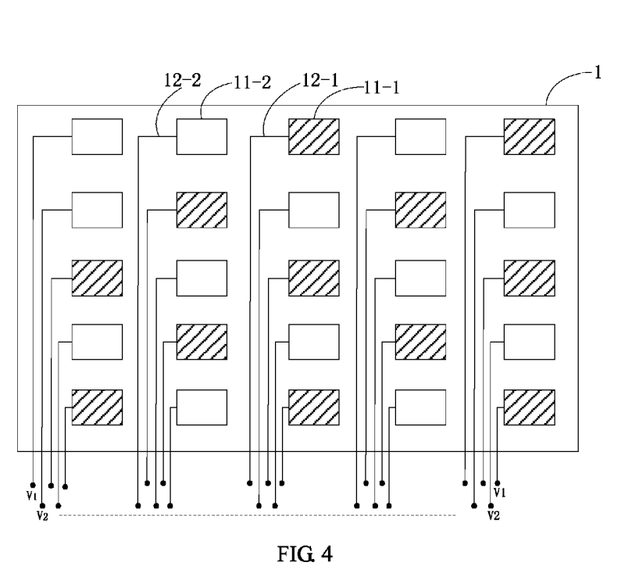
FIG. 4 is a schematic view of a luminance distribution of the touch panel in the situation of a first touch electrode being short-circuited, associated with an embodiment of the detecting method of an embedded type touch panel of the invention.

For example, as shown in FIG. 4, when the first touch electrode 11-1 at the top left corner which originally is in a dark state is changed to be in a bright state, it means that the first touch electrode 11-1 at the top left corner may be short-circuited with the neighboring second touch electrode 11-2 in the column direction, or be short-circuited with the neighboring second touch electrode 11-2 in the row direction. Of course, it also may be short-circuited with other second touch electrode 11-2. Based on this, a short circuit whether has occurred between touch electrodes can be determined according to the luminances associated with the first touch electrodes 11-1. The short circuit occurs between touch electrodes may be a short circuit occurs between touch-control wires, a short circuit occurs between touch-control wire and touch electrode, or a short circuit occurs between touch electrodes themselves.

In addition, an open circuit whether has occurred on the second touch electrodes 11-2 can be determined according to the luminances associated with the second touch electrodes 11-2, i.e., when one second touch electrode 11-2 is in a dark state, it means that the high voltage level is not applied onto the second touch electrode 11-2 and thus the second touch electrode 11-2 is open-circuited. When one second touch electrode 11-2 is in a dark state, a plurality of continuous display areas being in dark states would appear, and therefore an open circuit whether has occurred on the second touch electrodes 11-2 can be determined by just observing whether a plurality of continuous display areas being in the dark states are existed or not.

By the above solution, a short circuit whether has occurred on the first touch electrodes 11-1 can be determined according to the luminances of the first touch electrodes 11-1 and an open circuit whether has occurred on the second touch electrodes 11-2 can be determined according to the luminances of the second touch electrodes 11-2, and therefore the detection of touch panel can be simply and effectively realized. Moreover, when one first touch electrode 11-1 is short-circuited with one second touch electrode 11-2, the display area where the first touch electrode 11-1 is located and the display area where the second touch electrode 11-2 is located both are in bright states, and at this time at least two continuous display areas being in bright states would appear. Accordingly, during the detection, by just observing whether a plurality of continuous display areas being in bright states are existed or not, it can be determined whether a short circuit has occurred on the touch electrodes, and thus whether a failure occurs on the touch electrodes can be intuitively and quickly determined.

The failure of touch electrodes generally can be classified into three situations of being open-circuited, being short-circuited and being both shorted-circuit and open-circuited. By the above described step S301 and the step S302, it can detect out that a short circuit whether has occurred on neighboring two touch electrodes and also can achieve the open circuit detection of some touch electrode(s).

Step S303: supplying a high voltage level to the first touch electrodes 11-1 via corresponding touch-control wires 12-1 to make the display areas where the first touch electrodes 11-1 are located be bright states.

Step S304: supplying a low voltage level to the second touch electrodes 11-2 via corresponding touch-control wires 12-2 to make the display areas where the second touch electrodes are located be in dark states.

After completing the short circuit detection between neighboring first touch electrode 11-1 and second touch electrode 11-2, an open circuit detection is performed on the first touch electrodes 11-1. When driving the display areas where the first touch electrodes are located to be in bright states and driving the display areas where the second touch electrodes 11-2 to be in dark states, in the normal situation, the display areas where the first touch electrodes 11-1 are located all ought to be in bright states and the display areas where the second touch electrodes 11-2 are located all ought to be in dark states, and at this time a pattern exhibited on the whole display region of the touch panel is bright and dark alternately distributed. If the display area where one first touch electrode 11-1 is located is in a dark state, it means that an open circuit has occurred on the first touch electrode 11-1 corresponding to the display area, and at this time by just observing whether a plurality of continuous display areas being in dark states appeared or not, it can quickly determine that an open circuit whether has occurred on the first touch electrodes 11-1.

In addition, it is assumed that after performing the step S301 and the step S302, the first touch electrode 11-1 at the top left corner is detected out that it is short-circuited with a neighboring second touch electrode 11-2; and after performing the step S303 and the step S304, if the display area where the first touch electrode 11-1 at the top left corner is located and the display area where the neighboring second touch electrode 11-2 is located both are in dark states, it means that the first touch electrode 11-1 is open-circuited and also is short-circuited with the neighboring second touch electrode 11-2. If the display area where the first touch electrode 11-1 is located and the display area where the neighboring second touch electrode 11-2 is located both are in bright states, it means that the first touch electrode 11-1 only is short-circuited, and the second touch electrode 11-2 short-circuited therewith can be determined to be the second touch electrode 11-2 being in the bright state. Accordingly, open circuit detection, short circuit detection and both the open circuit and short circuit detections for the touch electrodes can be achieved, and the determination can be quickly done by just observing the luminances of the display areas, and thus it is simple and effective.

Of course, in an embodiment of the detecting method of an embedded type touch panel of the invention, before performing the step S301, an open circuit whether has occurred on the touch electrodes can be firstly determined. Specifically, before performing the step S301, the first touch electrodes 11-1 and the second touch electrodes 11-2 both are supplied with high voltage levels via respective corresponding touch-control wires 12-1, 12-2 to make the display areas where the first touch electrodes 11-1 are located and the display areas where the second touch electrodes 11-2 are located all be in bright states, i.e., the display areas corresponding to all the touch electrodes are driven to be in bright states, so that when a display area where one of the touch electrodes 11 is located is in a dark state, it means that the touch electrode 11 corresponding to the display area being in the dark state is open-circuited, and therefore it can firstly detect out some touch electrode(s) being open-circuited. When the display areas where all the touch electrodes 11 are located are in bright states, failure detections of short circuit and both short circuit and open circuit are performed, i.e., performing the step S301 through the step S304.

In other embodiment of the detecting method of an embedded type touch panel of the invention, the first touch electrodes may be the touch electrodes in odd rows, and the second touch electrodes may be the touch electrodes in even rows, and at this situation the first touch electrodes and the second touch electrodes are alternately arranged in the column direction. By supplying the first touch electrodes and the second touch electrodes with different voltages to make the display areas where the first touch electrodes are located and the display areas where the second touch electrodes are located have different luminances, whether a short circuit has occurred on the touch electrodes can be determined according to the luminances of the display areas where neighboring two touch electrodes respectively are located, and therefore the short circuit detection for the touch electrodes can be quickly and effectively achieved.

In addition, in other embodiment, in the step of supplying the first touch electrodes and the second touch electrodes with different voltages to make the display areas where the first touch electrodes are located and the display areas where the second touch electrodes are located have different luminances, it may be that supplying a high voltage level for exhibiting a bright state to the first touch electrodes, supplying another high voltage level for exhibiting another bright state to the second touch electrodes and making the two voltage levels have a certain difference, to thereby make the display areas where the first touch electrodes are located and the display areas where the second touch electrodes are located have different luminances; that is, in this embodiment, although the display areas where the first touch electrodes and the second touch electrodes are located all are in bright states, but the luminances respectively associated with the two types of touch electrodes are different from each other. The driving voltages are different, the luminances also are different correspondingly; and the larger the driving voltage difference is, the larger the luminance difference is.

For example, it may be that the first touch electrodes are supplied with a voltage of 3V and the second touch electrodes are supplied with a voltage of 10V, at this time the display areas where the first touch electrodes are located may only have a faint light and the display areas where the second touch electrodes are located may have relatively strong light, an obvious luminance difference is existed therebetween. Since the first touch electrodes and the second touch electrodes are alternately arranged, in the normal situation, the luminances of the display areas where the touch electrodes with a low voltage are located are relatively low, i.e., the part of display region is relative dark, and the luminances of the display areas where the touch electrodes with a high voltage are located are relatively high, i.e., the part of display region is relative bright, so that the luminance distribution of the display region of the whole touch panel also should be a distribution of light and shade. When one of the touch electrodes (first touch electrode or second touch electrode) is open-circuited, the display area where the touch electrode is located is in a dark state, i.e., the display area displays a black image and no light emits. Therefore, by observing whether a display area being in a dark state is existed or not, it can be determined that whether there is an open-circuited touch electrode or not. When one first touch electrode and one second touch electrode are short-circuited, the voltage of the touch electrode with the low voltage would be changed to be the same or approximately the same as the voltage of the touch electrode with the high voltage, and at this time the luminance of the display area where the touch electrode with the low voltage is located and the luminance of the display area where the touch electrode with the high voltage is located are the same or approximate. Therefore, by observing the luminance change of the display areas where the touch electrodes with the low voltage, it can be determined that whether there are short-circuited touch electrodes or not, i.e., when detecting out a plurality of continuous display areas being bright states, it means that there are short-circuited touch electrodes.

Figure 5:
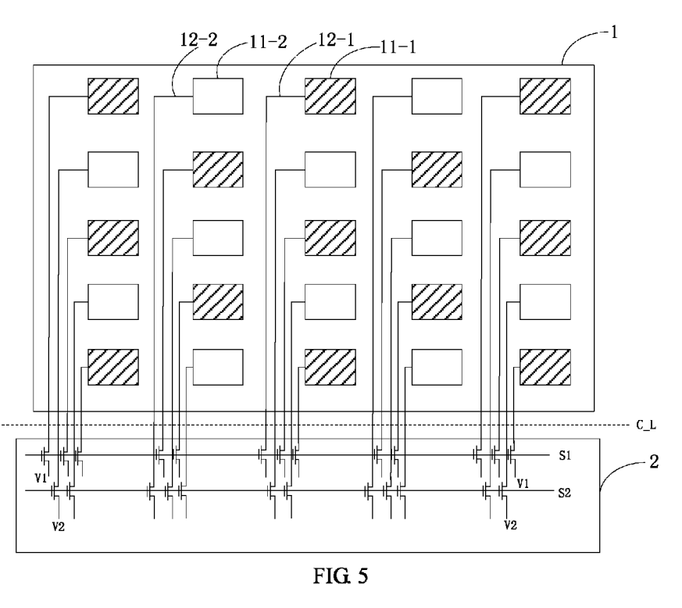
FIG. 5 is a structural schematic view of a used testing circuit, associated with an embodiment of the detecting method of an embedded type touch panel of the invention.

In the above embodiments, the voltages may be directly inputted via one ports of the touch-control wires corresponding to the respective touch electrodes; referring to FIG. 5, in another embodiment of the detecting method of an embedded type touch panel of the invention, it may be that ON-OFF switching of transistors are used to control the conduction and non-conduction between the touch-control wires and corresponding voltage sources and thus is easy to operate. Specifically, as shown in FIG. 5, the first touch electrodes 11-1 and the second touch electrodes 11-2 are alternately arranged on both the row direction and the column direction, when performing detection to the touch panel 1, firstly the touch-control wires 12 and a testing circuit 2 are connected together, and the testing circuit is a plurality of TFT transistors. More specifically, each of the touch-control wires 12 is electrically connected to a signal source via one TFT transistor, i.e., V1 and V2 ports are electrically connected to signal sources; gates of all the TFT transistors corresponding to the first touch electrodes 11-1 are electrically connected to a same control terminal S1, and gates of the TFT transistors corresponding to the second touch electrodes 11-2 are electrically connected to another control terminal S2.

When the detection is started, firstly, the V1 ports and the V2 ports simultaneously are supplied with same high voltage levels; all the TFT transistors then are switched on by the two control terminals S1, S2 and thus all the touch electrodes 11 are applied with same high voltage levels, so that the display areas where all the touch electrodes 11 respectively are located are in bright states. When a display area where one of the touch electrodes 11 is located appears to be a dark state, it means that the touch electrode 11 corresponding to the display area being in the dark state is open-circuited, and therefore the open-circuited touch electrode is detected out. In the next step, the TFT transistors corresponding to the first touch electrodes 11-1 are switched off by the control terminal S1, and at this time it is equivalent to supply a low voltage level of 0V to the first touch electrodes 11-1 so as to make the display areas where the first touch electrodes 11-1 be in dark states, the TFT transistors corresponding to the second touch electrodes 11-2 are maintained to be switched-on so as to make the display areas where the second touch electrodes 11-2 are located be kept in bright states, and therefore a short circuit whether has occurred on the first touch electrodes 11-1 can be determined according to the luminances of the display areas where the first touch electrodes 11-1 are located. After that, the TFT transistors corresponding to the first touch electrodes 11-1 are switched on by the control terminal S1 so as to make the display areas where the first touch electrodes 11-1 are located be in bright states, the TFT transistors corresponding to the second touch electrodes 11-2 are switched off by the control terminal S2 so as to make the display areas where the second touch electrodes 11-2 are located be in dark states, and therefore the short-circuited first touch electrode whether further is open-circuited or not can be determined according to the luminances of the display areas where the first touch electrodes 11-1 are located.

By the detecting method of this embodiment, the bright states or dark states of the display areas where the first touch electrodes are located and the display area where the second touch electrodes are located can be conveniently controlled by only the control terminal S1 and the control terminal S2 during the detecting process, and thus it is easy to operate.

After completing the detecting, the testing circuit 2 is cut off along a cutting line C_L, and then processes such as bonding are performed to the touch panel 1.

The invention also provides an embodiment of a manufacturing method of an embedded type touch panel. In the manufacturing method, firstly a plurality of touch electrodes which arranged in a matrix manner and insulated from one another are formed in a display region of a first substrate and touch-control wires electrically connected to the touch electrodes in one-to-one manner are formed, for example the touch panel 1 as shown in FIG. 2. The control-control wires extend along a first direction. Afterwards, a second substrate and the display region of the first substrate are bonded together and the touch panel after being bonded then is performed with detection. The detecting method can be the detecting method of any one of the above embodiments.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A detecting method of an embedded type touch panel, wherein the embedded type touch panel comprises a plurality of touch electrodes arranged in a matrix manner and insulated from one another, each of the plurality of touch electrodes and a touch-control wire are connected in one-to-one manner, the touch-control wire extends along a first direction, the plurality of touch electrodes also are used as a common electrode for driving pixels of the embedded type touch panel to display; the detecting method comprises:

supplying a low voltage level to first touch electrodes of the plurality of touch electrodes via corresponding touch-control wires to make display areas where the first touch electrodes are located be in dark states;

supplying a high voltage level to second touch electrodes of the plurality of touch electrodes via corresponding touch-control wires to make display areas where the second touch electrodes are located be in bright states, wherein the first touch electrodes and the second touch electrodes are alternately arranged on both the first direction and a second direction;

when the display area where one of the first touch electrodes is located is in a bright state, determining that the one of the first touch electrodes is short-circuited with the second touch electrode neighboring therewith on the first direction.

2. The detecting method as claimed in claim 1, wherein after the step of determining that the first touch electrode is short-circuited with the second touch electrode neighboring therewith on the first direction, comprises:

supplying a high voltage level to the first touch electrodes via corresponding touch-control wires to make the display areas where the first touch electrodes are located be in bright states;

supplying a low voltage level to the second touch electrodes via corresponding touch-control wires to make the display areas where the second touch electrode are located be in dark states;

when the display area where the one of the first touch electrodes is located and the display area where the second touch electrode neighboring with the one of the first touch electrodes is located both are in dark states, determining that the one of the first touch electrodes is open-circuited.

3. The detecting method as claimed in claim 1, wherein before supplying the first touch electrodes and the second touch electrodes alternately arranged at least on the first direction with different voltage levels via corresponding touch-control wires, comprises:

supplying the first touch electrodes and the second touch electrodes both with high voltage levels via corresponding touch-control wires to make the display areas where the first touch electrodes are located and the display areas where the second touch electrodes are located be in bright states;

when the display area where one of the first touch electrodes is located and/or the display area where one of the second touch electrodes is located is/are in a dark state(s), determining that the one of the first touch electrodes and/or the one of the second touch electrodes is/are open-circuited.

4. The detecting method as claimed in claim 1, wherein the step of supplying a low voltage level to first touch electrodes and the step of supplying a high voltage level to second touch electrodes are performed simultaneously.

5. A detecting method of an embedded type touch panel, wherein the embedded type touch panel comprises a plurality of touch electrodes arranged in a matrix manner and insulated from one another, each of the plurality of touch electrodes and a touch-control wire are electrically connected in one-to-one manner, the touch-control wire extends along a first direction, the plurality of touch electrodes also are used as a common electrode for driving pixels of the embedded type touch panel to display; the detecting method comprises:

simultaneously supplying first touch electrodes of the plurality of touch electrodes and second touch electrodes of the plurality of touch electrodes alternately arranged at least on the first direction with different voltages via corresponding touch-control wires to make display areas where the first touch electrodes are located and display areas where the second touch electrodes are located have different luminances, and at least determining neighboring first touch electrode and second touch electrode on the first direction whether are short-circuited or not according to the luminances of the display areas where the first touch electrodes are located or the luminances of the display areas where the second touch electrodes are located.

6. The detecting method as claimed in claim 5, wherein the step of supplying first touch electrodes and second touch electrodes alternately arranged at least on the first direction with different voltages via corresponding touch-control wires to make display areas where the first touch electrodes are located and display areas where the second touch electrodes are located have different luminances comprises:

supplying a low voltage level to the first touch electrodes via corresponding touch-control wires to make the display areas where the first touch electrodes are located be in dark states;

supplying a high voltage level to the second touch electrodes via corresponding touch-control wires to make the display areas where the second touch electrodes are located be in bright states;

when the display area where one of the first touch electrodes is located is in a bright state, determining that the one of the first touch electrodes is short-circuited with the second touch electrode neighboring therewith on the first direction.

7. The detecting method as claimed in claim 6, wherein after the step of determining that the one of the first touch electrodes is short-circuited with the second touch electrode neighboring therewith on the first direction, comprises:

supplying a high voltage level to the first touch electrodes via corresponding touch-control wires to make the display areas where the first touch electrodes are located be in bright states;

supplying a low voltage level to the second touch electrodes via corresponding touch-control wires to make the display areas where the second touch electrodes are located be in dark states;

when the display area where the one of the first touch electrodes is located and the display area where the second touch electrode neighboring with the one of the first touch electrodes is located both are in dark states, determining that the one of the first touch electrodes is open-circuited.

8. The detecting method as claimed in claim 6, wherein before the step of supplying first touch electrodes and second touch electrodes alternately arranged at least on the first direction with different voltages via corresponding touch-control wires, comprises:

supplying the first touch electrodes and the second touch electrodes both with high voltage levels via corresponding touch-control wires to make the display areas where the first touch electrodes are located and the display areas where the second touch electrodes are located be in bright states;

when the display area where one of the first touch electrodes is located and/or the display area where one of the second touch electrodes is located is/are in a dark state(s), determining that the one of the first touch electrode and/or the one of the second touch electrode is/are open-circuited.

9. The detecting method as claimed in claim 5, wherein the first touch electrodes and the second touch electrodes further are alternately arranged on a second direction.

10. A manufacturing method of an embedded type touch panel, comprising:

forming a plurality of touch electrodes which are arranged in a matrix manner and insulated from one another on a display region of a first substrate and forming touch-control wires electrically connected to the plurality of touch electrodes in one-to-one manner, wherein the touch-control wires extend along a first direction, the plurality of touch electrodes comprise first touch electrodes and second touch electrodes alternately arranged at least on the first direction, and the plurality of touch electrodes also are used as a common electrode for driving pixels of the embedded type touch panel to display;

bonding a second substrate with the display region of the first substrate to obtain the embedded type touch panel;

performing a detecting for the embedded type touch panel after the bonding, and a detecting method comprising:

simultaneously supplying the first touch electrodes of the plurality of touch electrodes and the second touch electrodes of the plurality of touch electrodes with different voltages via corresponding touch-control wires to make display areas where the first touch electrodes are located and display areas where the second touch electrodes are located have different luminances, and at least determining neighboring first touch electrode and second touch electrode on the first direction whether are short-circuited or not according to the luminances of the display areas where the first touch electrodes are located or the luminances of the display areas where the second touch electrodes are located.

11. The manufacturing method as claimed in claim 10, wherein the step of supplying the first touch electrodes and the second touch electrodes with different voltages via corresponding touch-control wires to make display areas where the first touch electrodes are located and display areas where the second touch electrodes are located have different luminances comprises:

supplying a low voltage level to the first touch electrodes via corresponding touch-control wires to make the display areas where the first touch electrodes are located be in dark states;

supplying a high voltage level to the second touch electrodes via corresponding touch-control wires to make the display areas where the second touch electrodes are located be in bright states;

when the display area where one of the first touch electrodes is located is in a bright state, determining that the one of the first touch electrodes is short-circuited with the second touch electrode neighboring therewith on the first direction.

12. The manufacturing method as claimed in claim 11, wherein after the step of determining that the one of the first touch electrodes is short-circuited with the second touch electrode neighboring therewith on the first direction, comprises:
  supplying a high voltage level to the first touch electrodes via corresponding touch-control wires to make the display areas where the first touch electrodes are located be in bright states;
  supplying a low voltage level to the second touch electrodes via corresponding touch-control wires to make the display areas where the second touch electrodes are located be in dark states;
  when the display area where the one of the first touch electrodes is located and the display area where the second touch electrode neighboring with the one of the first touch electrodes is located both are in dark states, determining that the one of the first touch electrodes is open-circuited.

13. The manufacturing method as claimed in claim 11, wherein before the step of supplying the first touch electrodes and the second touch electrodes alternately arranged at least on the first direction with different voltages via corresponding touch-control wires, comprises:
  supplying the first touch electrodes and the second touch electrodes both with high voltage levels via corresponding touch-control wires to make the display areas where the first touch electrodes are located and the display areas where the second touch electrodes are located be in bright states;
  when the display area where one of the first touch electrodes is located and/or the display area where one of the second touch electrodes is located is/are in a dark state(s), determining that the one of the first touch electrodes and/or the one of the second touch electrodes is/are open-circuited.

14. The manufacturing method as claimed in claim 10, wherein the first touch electrodes and the second touch electrodes further are alternately arranged on a second direction.

15. The manufacturing method as claimed in claim 10, further comprising:
  cutting off electrical connections between a testing circuit and the touch-control wires corresponding to the first touch electrodes and the second touch electrodes, after completing the detecting for the embedded type touch panel, wherein the testing circuit comprises a plurality of TFT transistors respectively electrically connected with the touch-control wires corresponding to the first touch electrodes and the second touch electrodes.

\* \* \* \* \*